(12) United States Patent
Hwang (10) Patent No.: US 11,292,396 B2
(45) Date of Patent: Apr. 5, 2022

(54) BRACKET FOR VEHICLE MOUNT DEVICE

(71) Applicant: NIFCO INC., Yokosuka (JP)

(72) Inventor: Jemin Hwang, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 17/215,705

(22) Filed: Mar. 29, 2021

(65) Prior Publication Data

US 2021/0323483 A1 Oct. 21, 2021

(30) Foreign Application Priority Data

Apr. 17, 2020 (JP) .............................. JP2020-073839

(51) Int. Cl.
  *B60R 11/00* (2006.01)
  *B60R 19/48* (2006.01)
  *G01S 13/931* (2020.01)

(52) U.S. Cl.
  CPC ............ *B60R 11/00* (2013.01); *B60R 19/483* (2013.01); *B60R 2011/004* (2013.01); *B60R 2011/005* (2013.01); *G01S 2013/93275* (2020.01)

(58) Field of Classification Search
  CPC ............. B60R 2021/0004; B60R 11/00; B60R 19/483; G01S 2013/9327; G01S 2013/93275
  See application file for complete search history.

(56) References Cited

U.S. PATENT DOCUMENTS

| 7,441,744 | B2* | 10/2008 | Chen | G11B 33/124 |
| | | | | 248/309.1 |
| 7,780,137 | B2* | 8/2010 | Hansel | B60S 1/0822 |
| | | | | 248/346.01 |
| 8,448,914 | B2* | 5/2013 | Roehr | B60S 1/0881 |
| | | | | 248/689 |
| 8,456,311 | B2* | 6/2013 | Wohlfahrt | F16M 13/02 |
| | | | | 340/604 |
| 8,763,970 | B2* | 7/2014 | Mordau | B60S 1/0888 |
| | | | | 248/300 |
| 9,016,148 | B2* | 4/2015 | Niemann | B60R 11/00 |
| | | | | 73/866.5 |
| 9,132,791 | B2* | 9/2015 | Yamasaki | B60R 16/0239 |
| 9,487,156 | B2* | 11/2016 | Frenzel | B60R 11/02 |
| 9,707,903 | B2* | 7/2017 | Rawlings | H04N 5/2257 |
| 9,862,332 | B2* | 1/2018 | Okuda | B60R 11/04 |

(Continued)

FOREIGN PATENT DOCUMENTS

JP 2019-178911 A 10/2019

*Primary Examiner* — Justin M Larson
(74) *Attorney, Agent, or Firm* — Manabu Kanesaka (57) ABSTRACT

A bracket for a vehicle mount device includes an attachment member for a vehicle side, and a holding portion for the vehicle mount device. The holding portion includes a receiving portion for receiving at least a part of the vehicle mount device by a sliding operation of the vehicle mount device, and a guide portion for a projecting portion of the vehicle mount device along a sliding direction of the sliding operation. The receiving portion includes a position setting wall for the side of the vehicle mount device, and a holding piece for one side of the vehicle mount device. The guide portion includes an elastic piece, which is elastically deformed by contacting the projecting portion during a sliding movement and returns to an original posture at an end of the sliding movement to engage the projection.

6 Claims, 9 Drawing Sheets

(56) References Cited

U.S. PATENT DOCUMENTS

| | | | | |
|---|---|---|---|---|
| 10,029,623 B2* | 7/2018 | Rawlings | | B60R 11/04 |
| 10,081,310 B2* | 9/2018 | Kasai | | G03B 11/045 |
| 10,145,952 B2* | 12/2018 | Hayashihara | | G01S 13/42 |
| 10,249,941 B2* | 4/2019 | Lopez, Jr. | | H01Q 1/3283 |
| 10,252,684 B2* | 4/2019 | Miyado | | B60R 11/04 |
| 10,288,986 B2* | 5/2019 | Blake, III | | G03B 17/561 |
| 10,459,319 B2* | 10/2019 | Kasai | | G03B 17/02 |
| 10,518,728 B2* | 12/2019 | Furumoto | | G01S 7/02 |
| 10,556,553 B2* | 2/2020 | Kasarla | | H04N 5/2251 |
| 10,627,264 B2* | 4/2020 | Vidal | | G01D 11/245 |
| 10,710,534 B2* | 7/2020 | Lund | | G01S 7/027 |
| 10,793,093 B2* | 10/2020 | Callewaert | | H01Q 1/421 |
| 10,793,095 B2* | 10/2020 | Horiuchi | | B60R 21/00 |
| 10,797,384 B2* | 10/2020 | Singh | | H01Q 1/3233 |
| 10,926,725 B2* | 2/2021 | Agarwal | | G01S 17/931 |
| 11,046,255 B2* | 6/2021 | Miwa | | G01S 7/521 |
| 11,073,600 B2* | 7/2021 | Hellinger | | G01S 7/032 |
| 2008/0092673 A1* | 4/2008 | Hansel | | B60S 1/0881 |
| | | | | 73/866.5 |
| 2010/0065707 A1* | 3/2010 | Hansel | | F16M 11/041 |
| | | | | 248/298.1 |
| 2015/0041510 A1* | 2/2015 | Frenzel | | B60R 11/02 |
| | | | | 224/482 |
| 2016/0009230 A1* | 1/2016 | Miyado | | B60R 11/00 |
| | | | | 224/482 |
| 2016/0023620 A1* | 1/2016 | Matori | | B60R 11/04 |
| | | | | 348/148 |
| 2017/0274836 A1* | 9/2017 | Kasai | | B60R 11/04 |
| 2020/0047683 A1* | 2/2020 | Kasai | | H04N 5/2253 |
| 2021/0001794 A1* | 1/2021 | Umeki | | B60R 11/00 |
| 2021/0057808 A1* | 2/2021 | Kim | | H01Q 1/42 |
| 2021/0227104 A1* | 7/2021 | Krishnan | | B60R 11/00 |
| 2021/0323483 A1* | 10/2021 | Hwang | | B60R 19/483 |
| 2021/0364631 A1* | 11/2021 | Hasegawa | | B60R 11/00 |

* cited by examiner

BRACKET FOR VEHICLE MOUNT DEVICE

BACKGROUND OF THE INVENTION

The present invention relates to an improvement of a bracket used for holding a vehicle mount device, such as a radar device, at a predetermined position on a vehicle.

As a bracket for attaching a radar device for a vehicle at a predetermined position of the vehicle, there is Patent Document 1. In the device of the Patent Document 1, the bracket includes a pair of side walls on a long edge side and a side wall on a front side. The radar device is mounted on the bracket by sliding the radar device to a position abutting against the side wall on the front side while side portions thereof are guided by the pair of side walls on the long edge side.

However, in the Patent Document 1, in mounting the radar device to the bracket, while the radar device is held in a direction against an urging force of a plate spring provided in the bracket, the radar device has to be sled to a position until a projection portion provided on a front side of the radar device is inserted into a through hole provided on a front side portion of the bracket. Due to a variation within a tolerance of a size at a side of the radar device and a variety of a size at the bracket, the attaching operation may not be smoothly performed. Also, in the Patent Document 1, the movement in the sliding direction of the radar device mounted on the bracket as stated above, is regulated by engaging the projection portion formed at the side portion of the radar device with a cut portion formed on the side wall at the long edge side of the bracket. This structure is also affected by the variety of the sizes.

Patent Document 1: Japanese Patent Publication No. 2019-178911

SUBJECT TO BE SOLVED BY THE INVENTION

The problems to be solved by the invention is, in a bracket for holding a vehicle mount device in a predetermined position, to facilitate an attachment operation by the sliding operation of the vehicle mount device to the bracket more easily.

In order to achieve the above object, the invention is directed to a bracket for a vehicle mount device for holding the vehicle mount device to a predetermined position in a vehicle. The bracket comprises an attachment member for a vehicle side; and a holding portion for the vehicle mount device. The holding portion includes a receiving portion for receiving at least a part of the vehicle mount device by a sliding operation of the vehicle mount device, and a guide portion for a projecting portion formed at a side of the vehicle mount device along a sliding direction of the sliding operation. The receiving portion includes a position setting wall for the side of the vehicle mount device, and a holding piece for one side of the vehicle mount device. The guide portion includes an elastic piece, which is configured to be elastically deformed by contacting the projecting portion during a sliding movement and returns to an original posture at an end of the sliding movement to engage the projection to thereby prevent a return movement of the vehicle mount device.

In the bracket, first, the projecting portion of the vehicle mount device is slid along the guide portion to enter the movement front side (front side) of the vehicle mount device to the receiving portion, so that a part of the vehicle mount device can be easily and stably held. Also, second, the vehicle mount device can be held in the sandwiching state by the holding pieces and the elastic pieces, and third, the vehicle mount device can be prevented from the return movement by engaging the elastic pieces to the projecting portions at the slide complete position.

In another aspect of the invention, the holding piece includes a contact portion for one face of the vehicle mount device, which is configured to receive the vehicle mount device by elastic deformation along with a contact of the contact portion relative to the one face during the sliding movement, and to elastically deform the elastic piece in a direction opposite to the holding piece by contacting the projecting portion during the sliding movement.

In another aspect of the invention, the receiving portion further includes a base portion configured to be located on the one face of the vehicle mount device and to extend the holding piece from the base portion to a movement rear side of the sliding movement.

In another aspect of the invention, the holding piece has a curved shape with the contact portion at a top in a section along a sliding direction.

In another aspect of the invention, the elastic piece includes an engaging portion for the projecting portion, which is an inclined face configured to gradually increase a height in a rear direction of the sliding movement.

In another aspect of the invention, the attachment member includes one face as an attachment face to the vehicle side to form the holding portion on a side opposite to the attachment member, and a window hole formed in a concave portion in the one face configured to retain the vehicle mount device held by the holding portion. The attachment member is formed of a material shielding electromagnetic waves.

ADVANTAGES OF THE INVENTION

In the present invention, in a bracket for holding the vehicle mount device at a predetermined position of the vehicle, an attaching operation by the sliding movement of the vehicle mount device relative to the bracket can be more easily made.

DETAILED DESCRIPTION OF PREFERRED EMBODIMENT

Hereinafter, a preferred embodiment of the invention is explained based on FIGS. 1-9. A bracket 1 of the embodiment is used for holding a vehicle mount device R, such as a radar device for a vehicle mount type, at a predetermined position of a vehicle P.

In the embodiment shown in the drawings, the bracket 1 holds the radar device inside a bumper Pa of the vehicle. In the example, the radar device sends and receives electromagnetic waves through the bumper Pa to detect a distance between the vehicle and another object.

The bracket 1 includes an attachment member 2 on a vehicle body side, and a holding member 3 for the vehicle mount device R.

In the embodiment, one surface 2a of the attachment member 2 is an attachment surface 2b on the vehicle side.

In the embodiment, the attachment member 2 has a plate shape with about a rectangle including an upper side 2c, a lower side 2d, a left side 2e and a right side 2f in a state seen from the one surface 2a side. In the embodiment, the right side 2f is longer than the left side 2e, and the lower side 2d inclines to increase a size in an up and down direction x (seen FIG. 3), as the lower side 2d goes to the left side 2e.

Also, on one surface 2a side of the attachment member 2, a dent 4 in a groove shape extending to a left-right direction y (see FIG. 3) is formed. The dent 4 is formed on the one surface 2a side of the attachment member 2 by forming a project portion 5 extending in the left-right direction on the other surface 2g side of the attachment member 2. By the project portion 5, a later described holding portion 3 is formed on the other surface 2g side.

Further, a window hole 6 is formed in the dent 4. The window hole 6 is formed between an upper wall 4a and a lower wall 4b of the dent 4, and shows an elongated slot shape in the left-right direction y.

In the embodiment shown, the vehicle mount device R has a rectangular shape having a main part Ra with one face Rb and another face Re. The vehicle mount device R is retained in the holding portion 3, as described later, such that the another face Re faces an inner face of the bumper Pa (see FIG. 6). The size of the window hole 6 in the upper-lower direction substantially coincides with the size of the face Ra of the vehicle mount device R in the upper-lower direction, and the vehicle mount device R is received in the dent 4 in the holding state.

In the example, the bracket 1 is formed of a material shielding the electromagnetic waves. In the example shown in the drawings, the bracket 1 is a molded article of a synthetic resin integrally provided with the attachment member 2 and the holding portion 3, and the synthetic resin has a characteristic with shielding electromagnetic waves.

In the example, the bracket 1 is attached to the bumper Pa by fixing the one face 2a to an inner face Pb of the bumper Pa by a tape, such as with two adhesive faces. In the fixed state, the vehicle mount device R is positioned inside the bumper Pa through the bracket 1 (see FIG. 6). Since the vehicle mount device R is retained inside the window hole 6 in the dent 4, in case the vehicle mount device R is a radar, it is possible to provide directional characteristic to the electromagnetic waves ejected through the bracket 1.

The holding portion 3 includes a receiving portion 7 receiving at least a part of the vehicle mount device R by the sliding operation of the vehicle mount device R, and guide portions 8, along a slide movement direction, for projecting portions Rd formed on a side portion Rc of the vehicle mount device R.

In the example shown, the vehicle mount device R is rectangle having a structure with one face Rb and another face Re, and four side portions Rc (faces at the thickness side). In the example shown, the projecting portions Rd are formed on the side portions Rc at the upper side and the side portion Rc at the lower side of the vehicle mount device R.

The projecting portion Rd has a rib shape which is long in the left-right direction y. The projecting portions Rd are respectively formed on two sides sandwiching the middle portion in the left-right direction y of the vehicle mount device R on the side portion Rc at the upper side and the side portion Rc on the lower side.

Figure 1:
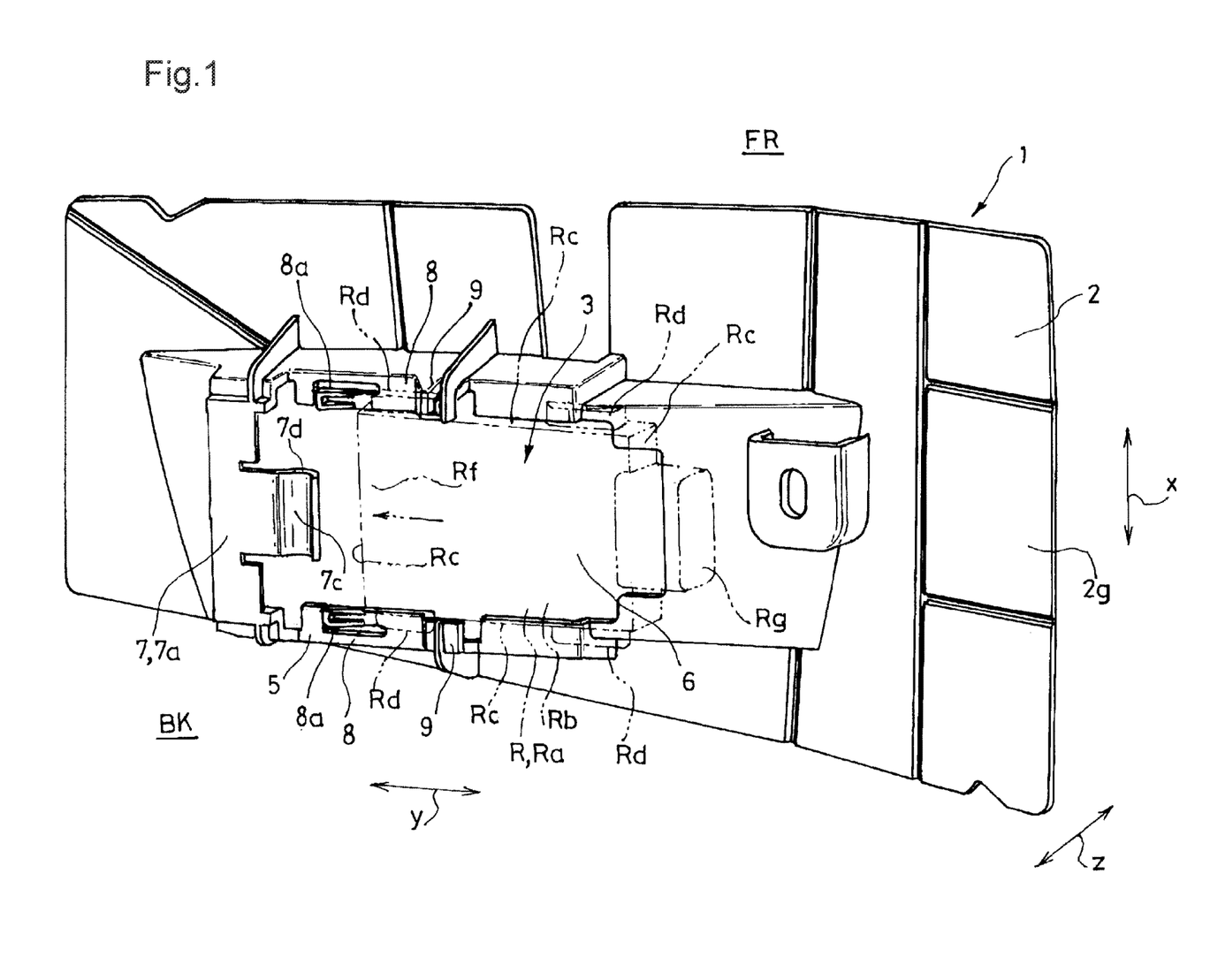
FIG. 1 is a perspective view of a bracket from a rear side, showing one embodiment of the invention in a state immediately before a vehicle mount device (indicated in an imaginary line) is held.
Figure 2:
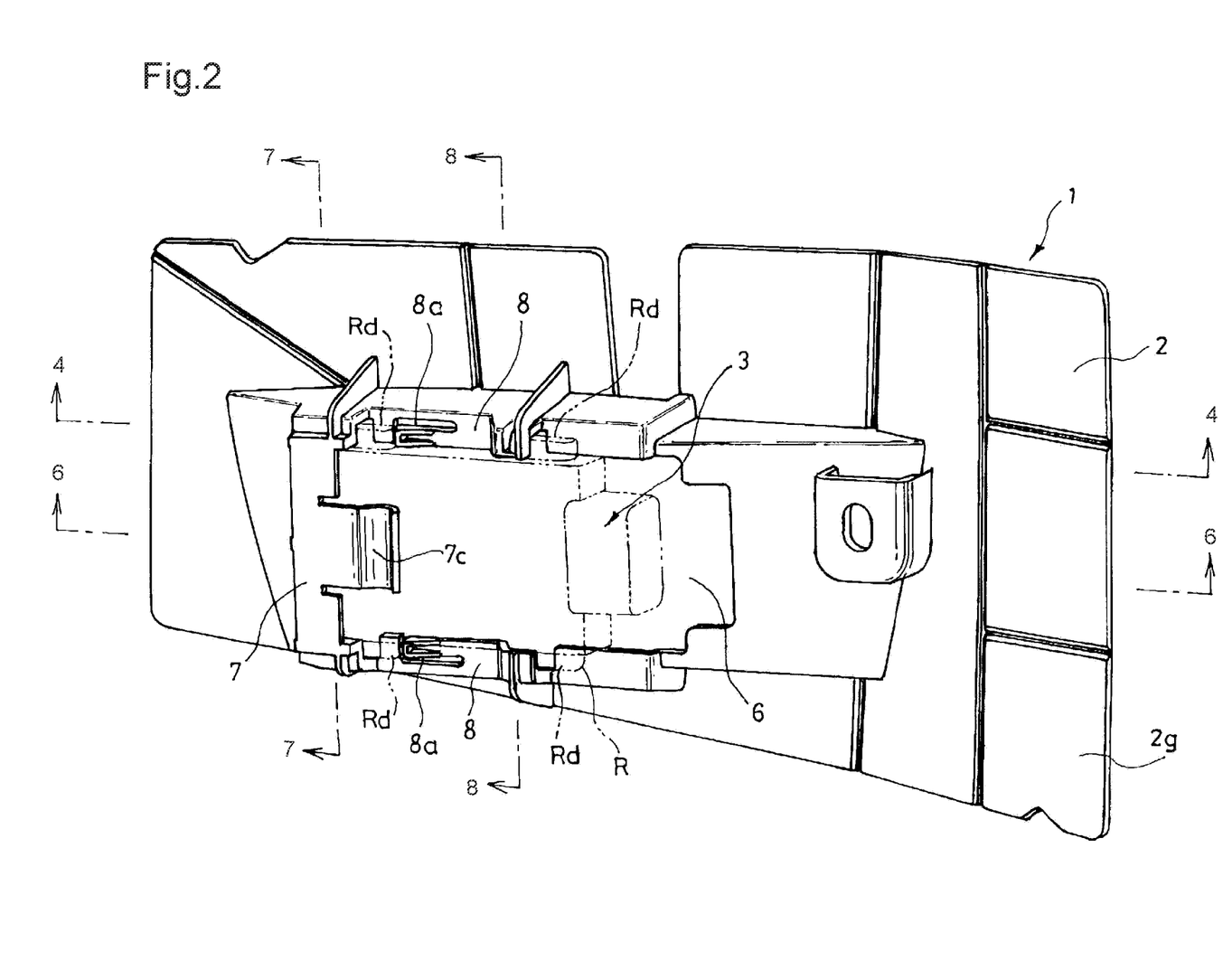
FIG. 2 is a perspective view of the bracket in a state wherein the vehicle mount device is held by the bracket by sliding the vehicle mount device leftward after the condition shown in FIG. 1.
Figure 3:
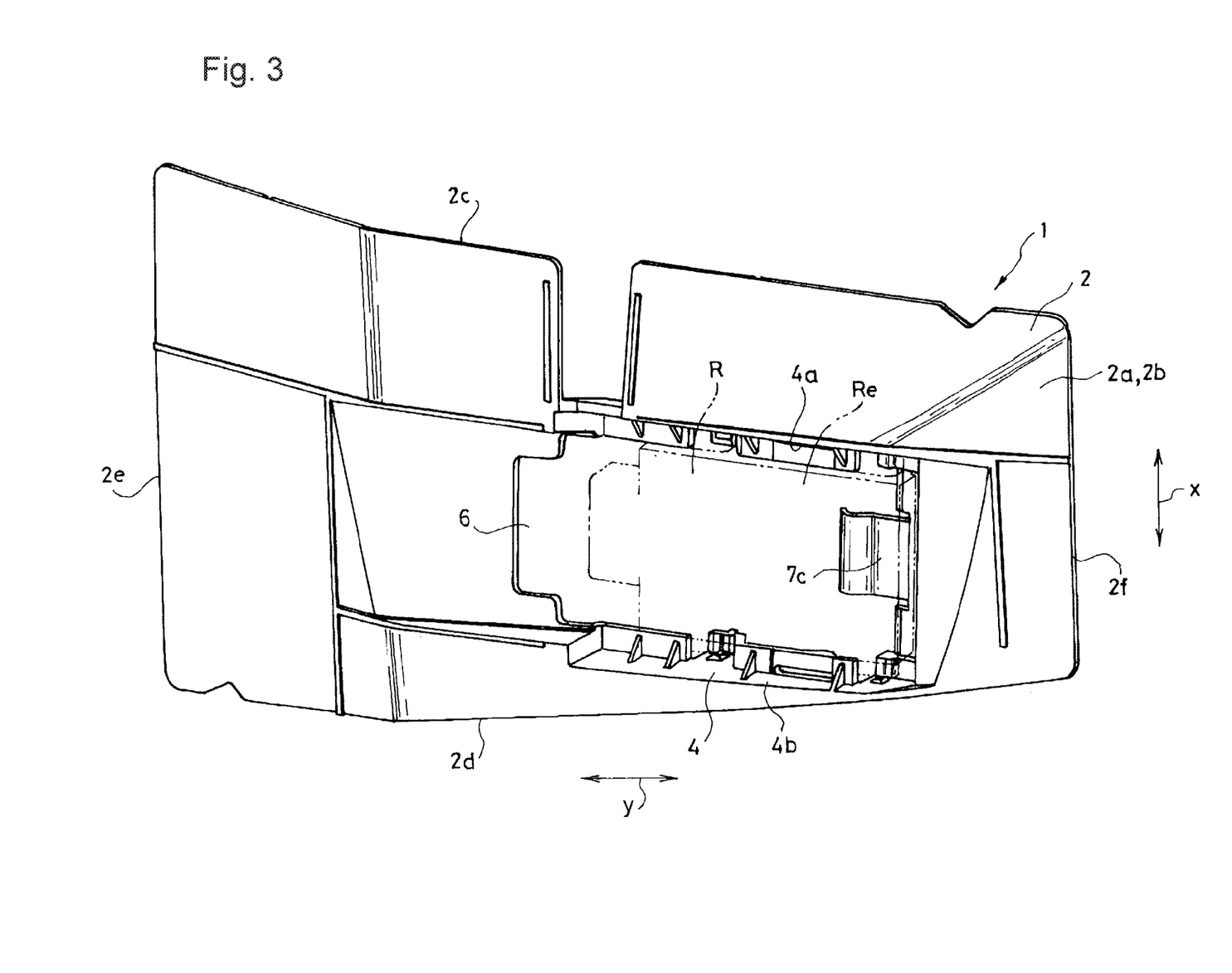
FIG. 3 is a perspective view showing the state in FIG. 2 on a side opposite to FIG. 2.
Figure 4:
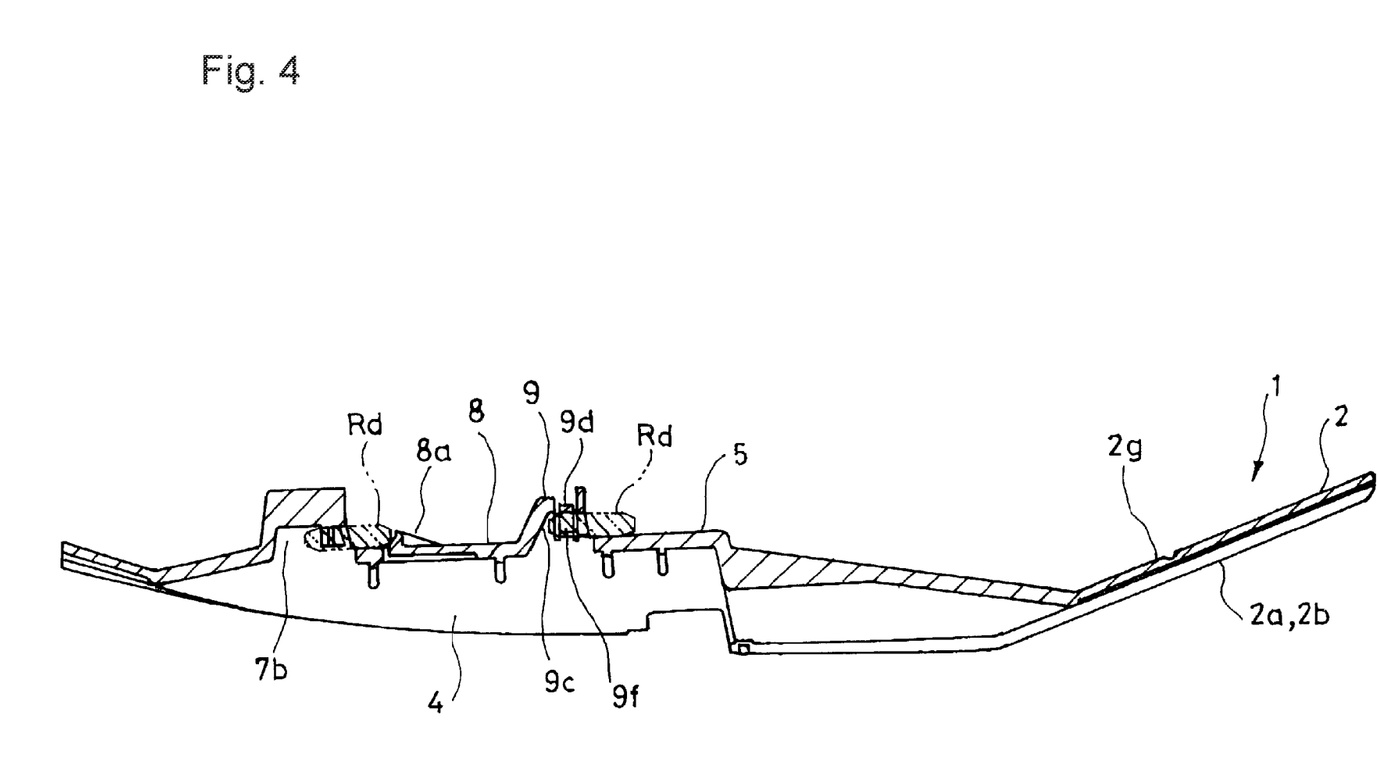
FIG. 4 is a sectional view taken along a line 4-4 in FIG. 2.

In the side portion Rc of the vehicle mount device R on the right side shown in FIG. 1, a connector portion Rg electrically connecting the vehicle mount device R to an outside is formed. The vehicle mount device R is retained in the holding portion 3 by sliding the slide movement operation, first entering the side portion Rc on the left side in FIG. 1.

The receiving portion 7 includes a base portion 7a positioned on the one face Rb of the vehicle mount device R, position setting walls 7b for the side portions Rc along the slide movement direction of the vehicle mount device R, and a holding piece 7c for the one face Rb of the vehicle mount device R.

In the example shown, guide portions 8 long in the left-right direction y are formed on the upper side and the lower side of the window hole 6 in the project portion 5.

Also, the receiving portion 7 is formed on the left side of the window hole 6 of the project portion 5 in FIG. 1.

Figure 6:
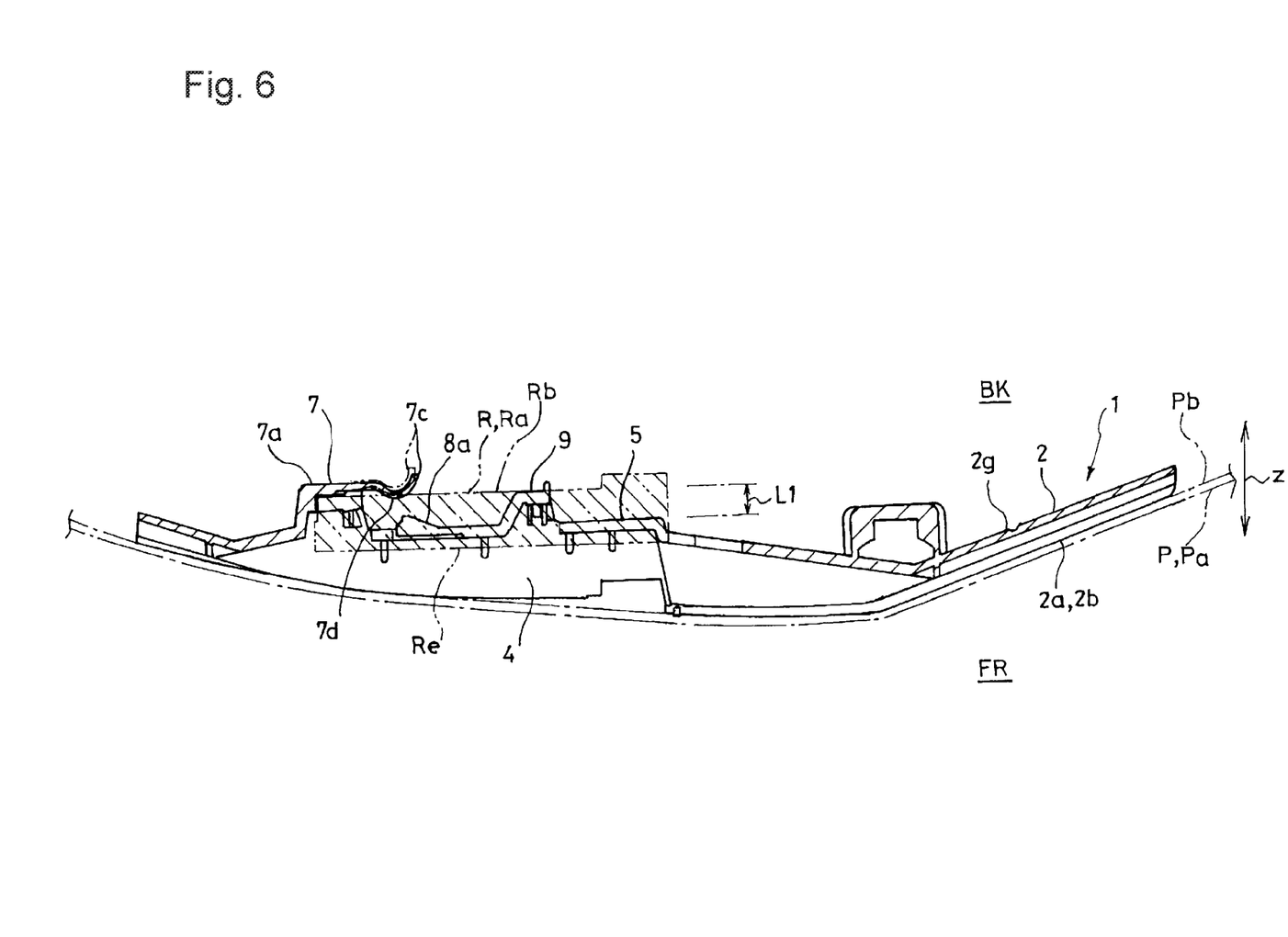
FIG. 6 is a sectional view taken along a line 6-6 in FIG. 2.
Figure 7:
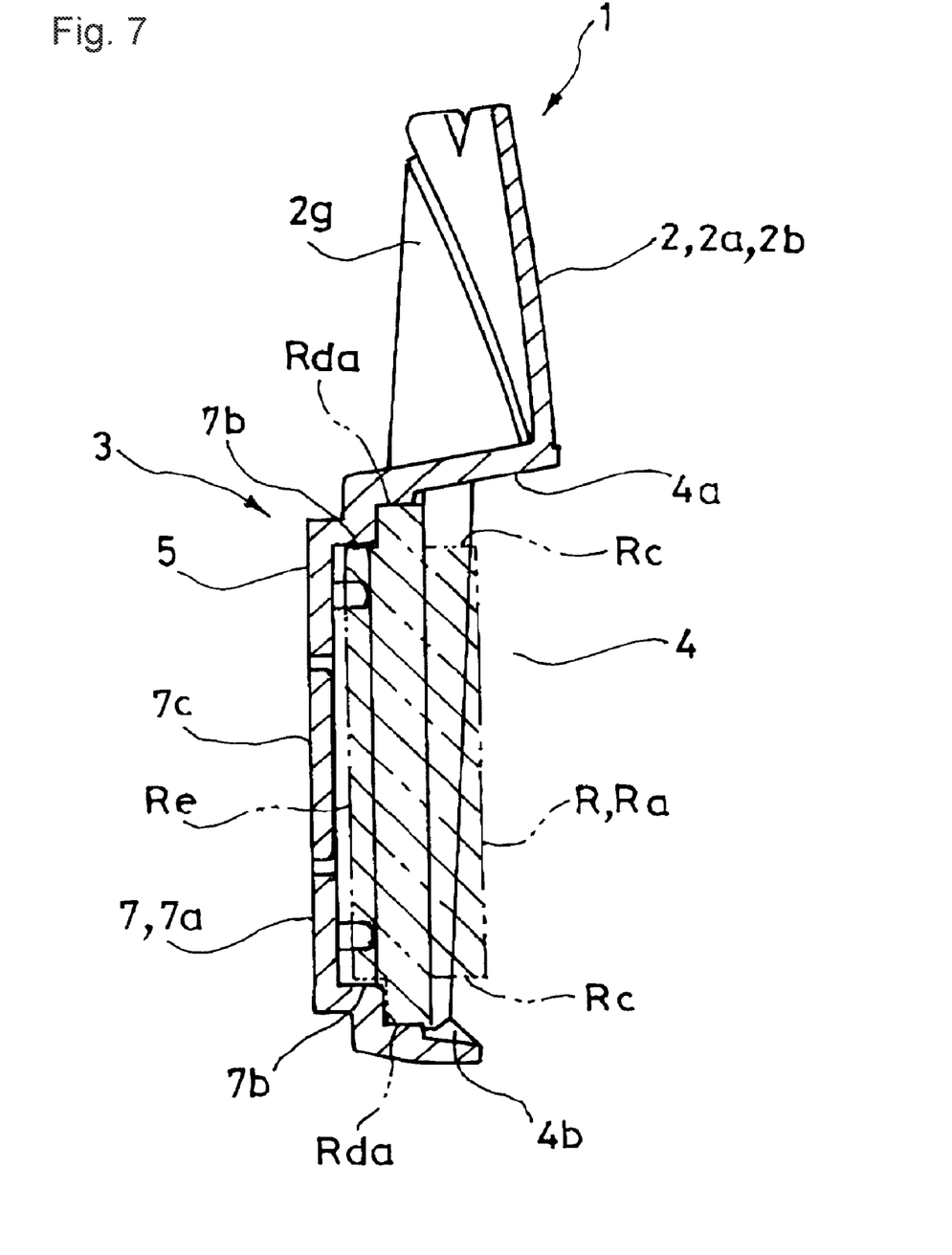
FIG. 7 is a sectional view taken along a line 7-7 in FIG. 2.
Figure 8:
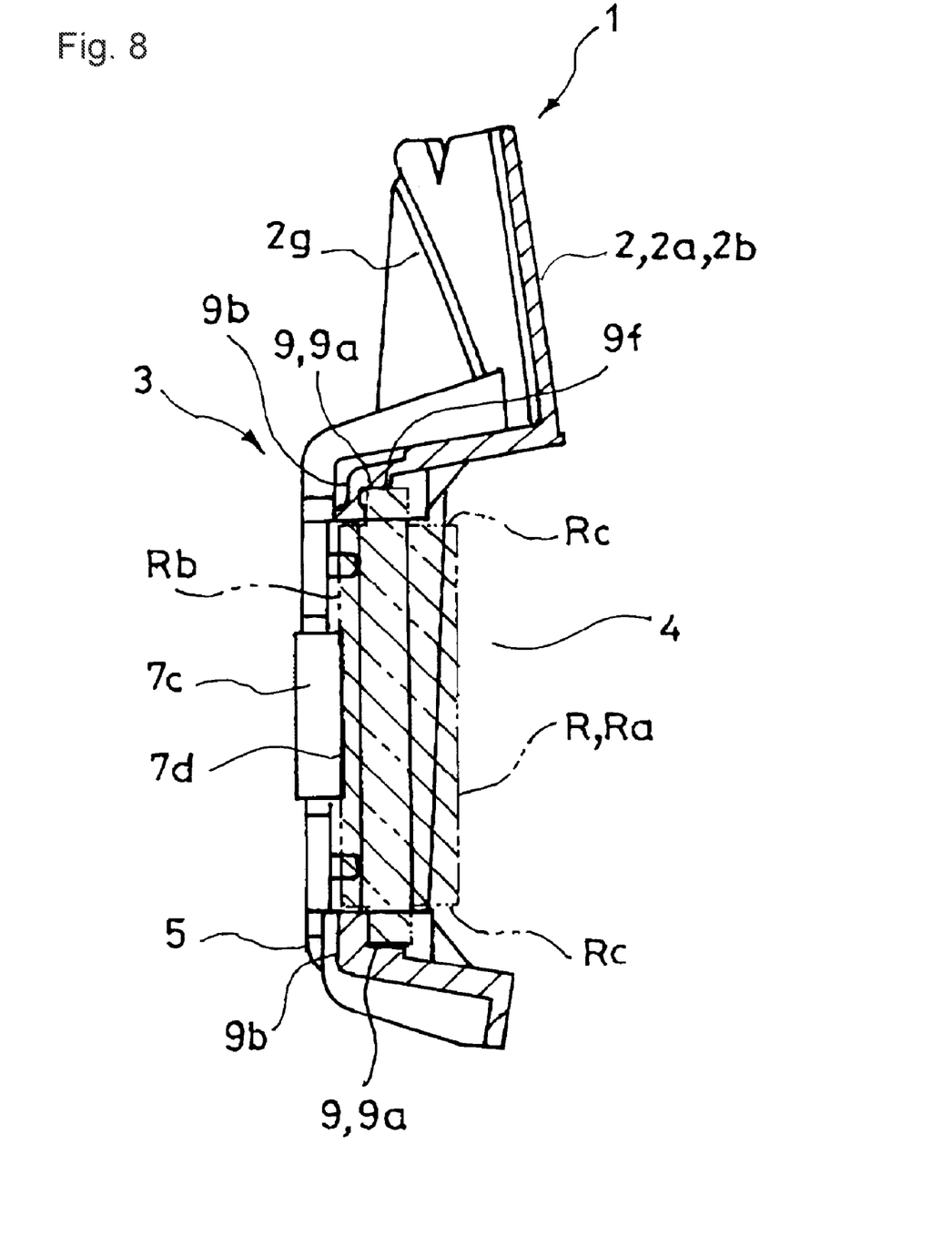
FIG. 8 is a sectional view taken along a line 8-8 in FIG. 2.

The position setting walls 7b are formed on the upper side and the lower side, and project to the back side BK relative to the guide portions 8 (See FIG. 6). The base portion 7a has a long plate shape between the position setting walls 7b in the up-down direction x.

As shown in FIG. 1, the vehicle mount device R is slid to the left side in a state that the projecting portion Rd on the upper side contacts the guide portion 8 on the upper side, and the projecting portion Rd on the lower side contacts the guide portion 8 on the lower side, so that the front portion Rf at the left side in FIG. 1 enters the receiving portion 7.

The holding piece 7c extends from the base portion 7a to the movement rear side in the slide movement, i.e. to the right side in the embodiment shown in FIG. 1.

In the example shown in the drawings, the holding piece 7c has a plate shape having one end connected to a middle in the up-down direction x of the base portion 7a with a width in the up-down direction x.

Also, the holding piece 7c includes a contact portion 7d relative to the one face Rb of the vehicle mount device R, and allows the reception of the vehicle mount device R by elastic deformation along with the contact of the contact portion 7d relative to the one face Rb during the slide movement, i.e. elastic deformation to the back side BK in the example shown in the drawings.

In the example shown in the drawings, the holding piece 7c has a cured shape such that the contact portion 7d is a top in the section along the sliding movement direction (see FIG. 6).

And, a length L1 between the guide portion 8 and the contact portion 7d in the front-back direction z (see FIG. 6) is slightly smaller than a length between the one face Rb of the vehicle mount device R and a side face Rdb on a side guided by the guide portion 8 in the projecting portion Rd.

On the other hand, the guide portion 8 includes an elastic piece 8a engaging the projecting portion Rd, which is elastically deformed by contacting the projecting portion Rd during the slide movement, and elastically returning to the original posture at the end of the slide movement, to thereby prevent the return movement of the vehicle mount device R.

The elastic piece 8a is elastically deformed to the direction opposite to the holding piece 7c, i.e. front side FR in the example shown in the drawings (see FIG. 6), by contacting the projecting portion Rd during the slide movement.

In the example shown in the drawings, the elastic pieces 8a are formed to the respective upper and lower guide portions 8. Each of the upper and lower guide portion 8 includes an additional receiving portion 9 at a middle in the left-right direction y.

And, the elastic piece 8a is provided at a portion between the additional receiving portion 9 and the receiving portion 7.

In the example shown in the drawings, the elastic piece 8a is formed by a part of the guide portion 8 divided by a first dividing groove 8b along the left-right direction y formed in the guide portion 8, and a second dividing groove 8c communicating a groove end of the first dividing groove 8b on the receiving portion 7 side and the window hole 6. The elastic piece 8a includes raised portions 8e projecting to the rear direction BK from a position in the middle of the length direction to a free end 8d.

The raised portion 8e includes a slant face 8g between the receiving portion 7 side and the opposite side thereof sandwiching the top portion 8f. The slant face 8g at the receiving portion 7 side in the raised portion 8e becomes the face raised toward the movement rear side in the slide movement, which functions as an engaging portion 8h relative to the projecting portion Rd in the elastic piece 8a.

Figure 9:
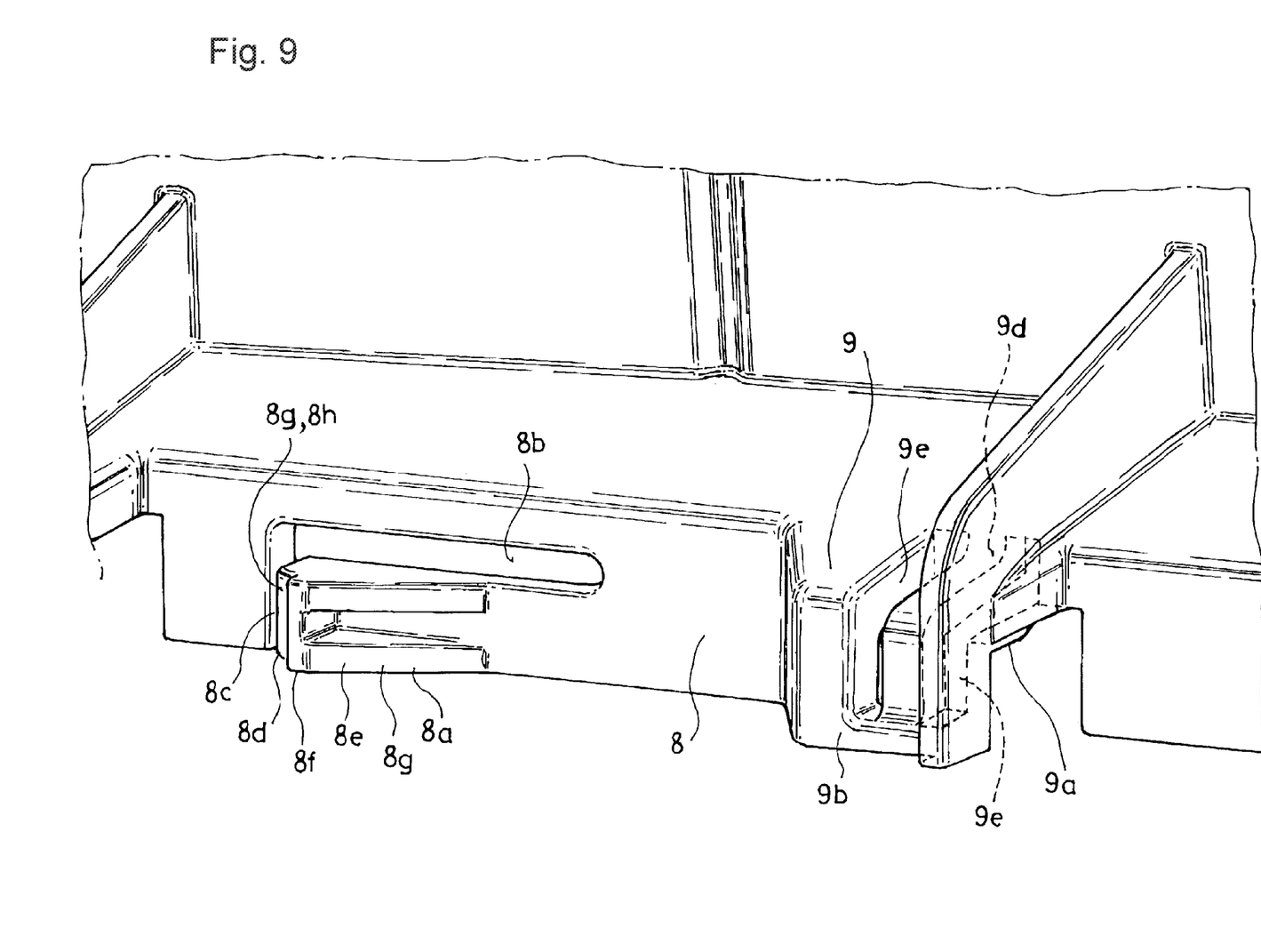
FIG. 9 is an enlarged view of an important part of the bracket.

As shown in FIG. 9, an additional receiving portion 9 includes a wall portion 9a relative to a projecting end Rda (refer to FIG. 7) of the projecting portion Rd of the vehicle mount device R, a flange portion 9b relative to a side face Rdc (refer to FIG. 5) opposite to a side face Rdb on a side guided by the guide portion 8 in the projecting portion Rd, and a stopper portion 9c (refer to FIG. 4) relative to an end portion Rdd (refer to FIG. 5) positioned on the movement front side of the slide movement in the projecting portion Rd.

The projecting porting Rd positioned on the movement front side (front side) of the slide movement for the vehicle mount device R is disposed between the additional receiving portion 9 and the elastic piece 8a, and the projecting portion Rd positioned on the movement rear side of the slide movement for the vehicle mount device R is positioned on the movement rear side of the slide movement relative to the additional receiving portion 9, so that the upper and lower projecting portions Rd are contacted to the upper and lower guide portions 8. Then, the projecting portions Rd are slid on the guide portions 8 to slide the vehicle mount device R on the guide portions 8 (movement operation to the left side in FIG. 1) to thereby hold the vehicle mound device R to the holding portion 3.

In detail, when the vehicle mound device R is slid as explained above, the movement front side (front side) of the vehicle mount device R is received in the receiving portion 7 while the holding piece 7c and the elastic pieces 8a are both being elastically deformed. The elastic deformation is smoothly performed by the curved shape of the holding piece 7c and the slant surfaces 8g of the elastic pieces 8a. Also, if there is no holding piece 7c, it is difficult to enter the front portion Rf of the vehicle mount device R to the receiving portion 7 by pushing the vehicle mount device R, by the elastic force of the elastic pieces 8a, to the rearward BK in the example shown, but it is possible to smoothly insert the front portion to the receiving portion 7 by the holding pieces 7c and the elastic forces.

In the embodiment shown in the drawings, the slide movement operation is permitted to the position that the projecting portions Rd on the movement rear side of the vehicle mount device R abut against the stopper portions 9c of the additional receiving portions 9. When the slide movement is completed, the elastic pieces 8a elastically return to engage the projecting portions Rd, and the return movement of the vehicle mount device R is prevented.

Figure 5:
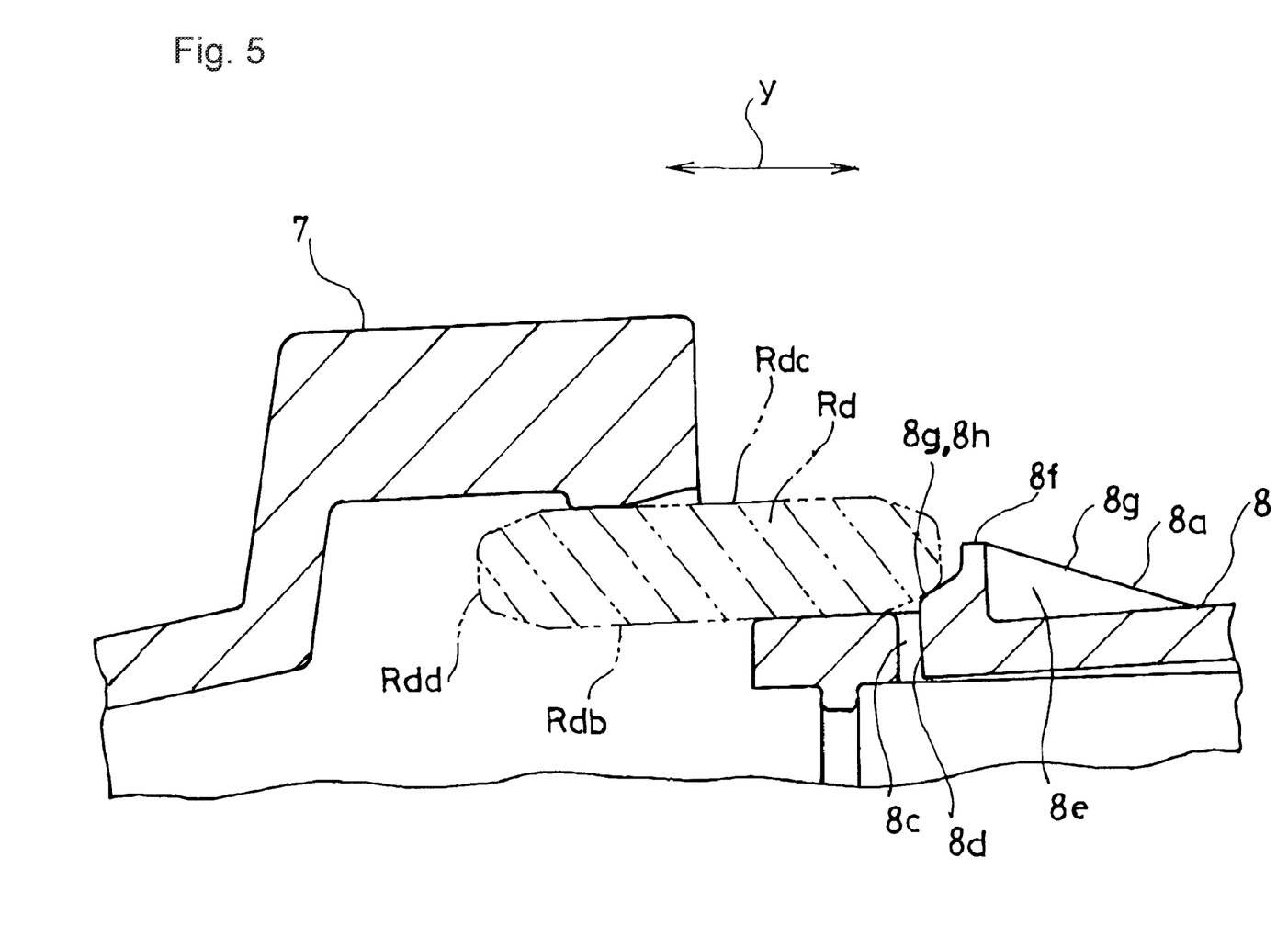
FIG. 5 is an enlarged view of an important part of FIG. 4.

Also, in the embodiment shown in the drawings, since the engagement portions of the elastic pieces 8a become slant faces 8g, even if there is a variation in size within a tolerance in the left-right direction y on the vehicle mount device R side, it is possible to hold the vehicle mount device R with the holding piece 7c in the condition of elastically deforming the elastic pieces 8a in the sandwiching condition without wobbling (refer to FIG. 5).

Therefore, according to the bracket 1 of the embodiment, first, the projecting portions Rd of the vehicle mount device R are slid along the guide portion 8 to enter the movement front side (front side) of the vehicle mount device R to the receiving portion 7, so that a part of the vehicle mount device R can be easily and stably held. Also, second, the vehicle mount device R can be held in the sandwiching state by the holding piece 7c and the elastic pieces 8a as parts of the guide portion 8, and third, the vehicle mount device R can be prevented from the return movement by engaging the elastic pieces 8a to the projecting portions Rd at the slide complete position.

In the embodiment shown in the drawings, the vehicle mount device R can be held without wobbling in the up-down direction x by the position stetting walls 7b of the receiving portion 7. Also, the vehicle mount device R can be held without wobbling in the front-rear direction z by the holding piece 7c and the elastic pieces 8a. Further, the vehicle mount device R is prevented from movement in the left-right direction y by the elastic pieces 8a.

Also, in the embodiment shown in the drawings, one of the additional receiving portions 9, i.e. in the embodiment, a part of a wall portion 9a relative to the projecting end Rda of the projecting portion Rd of the vehicle mount device R at the upper side of the additional receiving portion 9, becomes an elastic deformable portion 9d which is elastically deformed by contacting the projecting portion Rd when receiving the projecting portion Rd to the additional receiving portion 9.

In the embodiment shown in the drawings, the elastic deformable portion 9d is formed by the wall portion 9a divided by two dividing grooves 9e extending between the wall portion 9a and the flange portion 9b and a part of the flange portion 9b (refer to FIG. 9). A projection 9f is formed on an inner surface at an inner side of the additional receiving portion 9 of the elastic deformable portion 9d (refer to FIGS. 4 and 8), and in receiving the projecting portion Rd to the additional receiving portion 9, in a state that the elastic deformable portion 9d is elastically deformed outwardly (upwardly in the illustrated embodiment) by contacting the projection 9f to the projection end Rda of the projecting portion Rd, the projection 9f is press-contacted against a projection of the projecting portion Rd. Accordingly, in the illustrated embodiment, the vehicle mount device R is held without wobbling in the up-down direction at the additional receiving portion 9.

Also, as is clear, the present invention is not limited to the embodiment explained above, and includes embodiments which can attain the object of the invention.

EXPLANATION OF SYMBOLS

1: Bracket
2: Attachment member

3: Holding portion
7: Receiving portion
7b: Position setting wall
7c: Holding piece
8: Guide portion
8a: Elastic piece
R: Vehicle mount device
Rc: Side portion
Rd: Projecting portion

What is claimed is:

1. A bracket for a vehicle mount device for holding the vehicle mount device to a predetermined position in a vehicle, comprising:
an attachment member for a vehicle side; and
a holding portion for the vehicle mount device,
wherein the holding portion includes a receiving portion for receiving at least a part of the vehicle mount device by a sliding operation of the vehicle mount device, and a guide portion for a projecting portion formed on the vehicle mount device along a sliding direction of the sliding operation,
the receiving portion includes a position setting wall for the vehicle mount device, and a holding piece for one side of the vehicle mount device, and
the guide portion includes an elastic piece, which is configured to be elastically deformed by contacting the projecting portion during a sliding movement and returns to an original posture at an end of the sliding movement to engage the projection to thereby prevent a return movement of the vehicle mount device.

2. A bracket for a vehicle mount device according to claim 1, wherein the holding piece includes a contact portion for one face of the vehicle mount device, which is configured to receive the vehicle mount device by elastic deformation along with a contact of the contact portion relative to the one face in during the sliding movement, the elastic piece elastically deforming in a direction opposite to the holding piece by contacting the projecting portion during the sliding movement.

3. A bracket for a vehicle mount device according to claim 1, wherein the receiving portion further includes a base portion configured to be located on the one face of the vehicle mount device, the holding piece extending from the base portion to a movement rear side of the sliding movement.

4. A bracket for a vehicle mount device according to claim 1, wherein the holding piece has a curved shape with a contact portion at a top in a section along a sliding direction.

5. A bracket for a vehicle mount device according to claim 1, wherein the elastic piece includes an engaging portion for the projecting portion, which is an inclined face to gradually increase a height in a rear direction of the sliding movement.

6. A bracket for a vehicle mount device according to claim 1, wherein the attachment member includes one face as an attachment face to the vehicle side to form the holding portion on a side opposite to the attachment member, and a window hole formed in a concave portion in the one face configured to retain the vehicle mount device held by the holding portion, the attachment member being formed of a material shielding electromagnetic waves.

* * * * *